US012687908B2

(12) United States Patent
Messick et al.

(10) Patent No.: US 12,687,908 B2
(45) Date of Patent: Jul. 21, 2026

(54) SYSTEMS AND METHODS FOR DISAGGREGATED POWER CONTROL OF A SERVER RACK

(71) Applicant: Dell Products L.P., Round Rock, TX (US)

(72) Inventors: Douglas E. Messick, Austin, TX (US); Kyle E. Cross, Austin, TX (US); Binay A. Kuruvila, Cedar Park, TX (US); Thomas Foxworth Archer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 18/422,015

(22) Filed: Jan. 25, 2024

(65) Prior Publication Data

US 2025/0244812 A1     Jul. 31, 2025

(51) Int. Cl.
*G06F 1/26* (2006.01)

(52) U.S. Cl.
CPC .................................... *G06F 1/266* (2013.01)

(58) Field of Classification Search
None
See application file for complete search history.

(56) References Cited

U.S. PATENT DOCUMENTS

| | | | | |
|---|---|---|---|---|
| 9,250,684 B1 * | 2/2016 | Chen | ...................... | G06F 1/3206 |
| 2014/0195828 A1 * | 7/2014 | Varma | ................... | G06F 1/3296 |
| | | | | 713/300 |
| 2014/0281614 A1 * | 9/2014 | Mick | ..................... | H04L 67/303 |
| | | | | 713/320 |
| 2015/0338896 A1 * | 11/2015 | Khatri | ..................... | G06F 1/324 |
| | | | | 713/320 |
| 2017/0336856 A1 * | 11/2017 | Ragupathi | ............. | G06F 1/3234 |
| 2019/0324517 A1 * | 10/2019 | Keceli | ................... | G06F 1/3275 |
| 2021/0318745 A1 * | 10/2021 | Manousakis | ........ | G06F 9/45558 |

* cited by examiner

*Primary Examiner* — Paul Yen
(74) *Attorney, Agent, or Firm* — Fogarty LLP

(57) ABSTRACT

Systems and methods for disaggregated power control of a server rack are described. In an illustrative, non-limiting embodiment, an Information Handling System (IHS) may include: a processor; and a memory coupled to the processor, where the memory includes program instructions stored thereon that, upon execution by the processor, cause the IHS to: obtain power telemetry from a plurality of nodes of a server rack; obtain power shelf telemetry from one or more power shelves of the server rack; determine, based at least in part on the power telemetry and the power shelf telemetry, respective power limits for respective individual nodes of the plurality of nodes, including a first power limit for a first node of the plurality of nodes; and provide the determined respective power limits to the respective individual nodes of the server rack, including the first power limit to the first node.

9 Claims, 8 Drawing Sheets

200

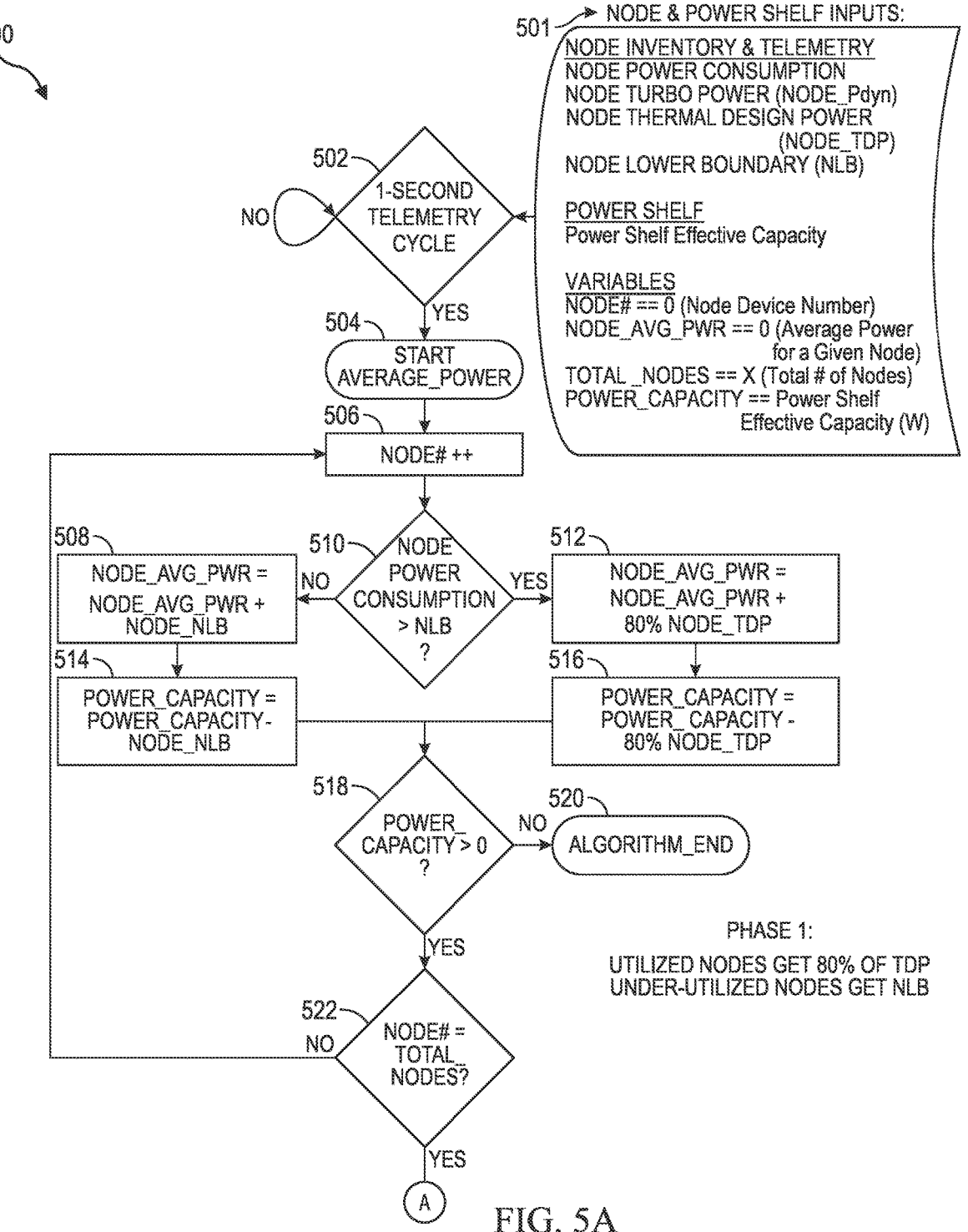

500

501 → NODE & POWER SHELF INPUTS:

NODE INVENTORY & TELEMETRY
NODE POWER CONSUMPTION
NODE TURBO POWER (NODE_Pdyn)
NODE THERMAL DESIGN POWER
                    (NODE_TDP)
NODE LOWER BOUNDARY (NLB)

POWER SHELF
Power Shelf Effective Capacity

VARIABLES
NODE# == 0 (Node Device Number)
NODE_AVG_PWR == 0 (Average Power
                    for a Given Node)
TOTAL _NODES == X (Total # of Nodes)
POWER_CAPACITY == Power Shelf
                    Effective Capacity (W)

502 — 1-SECOND TELEMETRY CYCLE

NO

YES

504 — START AVERAGE_POWER

506 — NODE# ++

510 — NODE POWER CONSUMPTION > NLB ?

NO → 508 — NODE_AVG_PWR = NODE_AVG_PWR + NODE_NLB

YES → 512 — NODE_AVG_PWR = NODE_AVG_PWR + 80% NODE_TDP

514 — POWER_CAPACITY = POWER_CAPACITY- NODE_NLB

516 — POWER_CAPACITY = POWER_ CAPACITY - 80% NODE_TDP

518 — POWER_ CAPACITY > 0 ?

NO → 520 — ALGORITHM_END

YES

522 — NODE# = TOTAL_ NODES?

NO

YES (A)

PHASE 1:
UTILIZED NODES GET 80% OF TDP
UNDER-UTILIZED NODES GET NLB

FIG. 5A

SYSTEMS AND METHODS FOR DISAGGREGATED POWER CONTROL OF A SERVER RACK

FIELD

This disclosure relates generally to Information Handling Systems (IHSs), and more specifically, to systems and methods for disaggregated power control of a server rack.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs can be housed in server racks of data centers. A data center is a building, a dedicated space within a building, or a group of buildings used to house computer systems and associated components, such as telecommunications and storage systems. Since IT operations are crucial for business continuity, it generally includes redundant or backup components and infrastructure for power supply, data communication connections, environmental controls (e.g., air conditioning, fire suppression), and various security devices. A large data center is an industrial-scale operation using as much electricity as a small town. A server rack, or simply "rack", is a frame or enclosure, with one or more dimensions typically standardized, for mounting multiple electronic equipment modules. Each module has a front panel that typically has a standardized width, which sometimes is 19 inches wide, for example. The standardized width (e.g., 19-inches) dimension includes the edges or ears that protrude from each side of the equipment, allowing the module to be fastened to the rack frame with screws or bolts. Common uses include computer servers, telecommunications equipment and networking hardware, audiovisual production gear, music production equipment, and scientific equipment.

SUMMARY

Systems and methods for disaggregated power control of a server rack are described. In an illustrative, non-limiting embodiment, an Information Handling System (IHS) may include: a processor; and a memory coupled to the processor, where the memory includes program instructions stored thereon that, upon execution by the processor, cause the IHS to: obtain power telemetry from a plurality of nodes of a server rack; obtain power shelf telemetry from one or more power shelves of the server rack; determine, based at least in part on the power telemetry and the power shelf telemetry, respective power limits for respective individual nodes of the plurality of nodes, including a first power limit for a first node of the plurality of nodes; and provide the determined respective power limits to the respective individual nodes of the server rack, including the first power limit to the first node.

In some embodiments, the first node is configured to limit its power consumption to the first power limit. In some embodiments, each of the individual nodes is configured to limit its power consumption to a respective determined power limit. In some embodiments, the power telemetry includes at least one of: power inventory of the plurality of nodes, power consumption of the plurality of nodes, turbo power of the plurality of nodes, thermal design power of the plurality of nodes, or a power inventory lower boundary of the plurality of nodes. In some embodiments, the power shelf telemetry includes at least one of: power capacity of the one or more power shelves, or power capability of the one or more power shelves.

In some embodiments, the program instructions further cause the IHS to: determine that each of the individual nodes is either a utilized node or an under-utilized node. In some embodiments, to determine the respective power limits for the respective individual nodes, the program instructions further cause the IHS to: determine that the respective power limits for the utilized nodes include a percentage of a thermal design power above 50%; and determine that the respective power limits for the under-utilized nodes include a node lower boundary power. In some embodiments, to determine the respective power limits for the respective individual nodes, the program instructions further cause the IHS to: determine that the respective power limits for the utilized nodes include a thermal design power; and determine that the respective power limits for the under-utilized nodes include a percentage of the thermal design power above 50%. In some embodiments, to determine the respective power limits for the respective individual nodes, the program instructions further cause the IHS to: determine that the respective power limits for the utilized nodes include a percentage of a thermal design power above 100%; and determine that the respective power limits for the under-utilized nodes include the thermal design power.

In some embodiments, to determine the respective power limits for the respective individual nodes, the program instructions further cause the IHS to: determine, based at least in part on the power shelf telemetry, a remaining power capacity for the server rack; and determine that the respective power limits for the respective individual nodes include an equal distribution of the remaining power capacity for the server rack. In some embodiments, each of the one or more power shelves includes one or more power supplies. In some embodiments, the power telemetry and the power shelf telemetry is obtained via a network. In some embodiments, the one or more power shelves include one or more disaggregated power shelves. In some embodiments, the obtaining the power telemetry, the obtaining the power shelf telemetry, the determining, and the providing is repeatedly performed after an interval. In some embodiments, the interval is between 0.1 and 10 seconds. In some embodiments, to determine the respective power limits for the respective individual nodes, the program instructions further cause the IHS to: determine a respective average power limit for the respective individual nodes using a plurality of phases of calculation.

In another illustrative, non-limiting embodiment, one or more non-transitory computer-readable storage media store program instructions that when executed on or across one or more processors of an Information Handling System (IHS), cause the one or more processors to: obtain power telemetry from a plurality of nodes of a server rack; obtain power shelf telemetry from one or more power shelves of the server rack; determine, based at least in part on the power telemetry and the power shelf telemetry, respective power limits for respective individual nodes of the plurality of nodes, including a first power limit for a first node of the plurality of nodes; and provide the determined respective power limits to the respective individual nodes of the server rack, including the first power limit to the first node.

In some embodiments, the program instructions further cause the one or more processors to: determine that each of the individual nodes is either a utilized node or an under-utilized node, such that the individual nodes include one or more utilized nodes and one or more under-utilized nodes.

In another illustrative, non-limiting embodiment, a method includes: obtaining power telemetry from a plurality of nodes of a server rack; obtaining power shelf telemetry from one or more power shelves of the server rack; determining, based at least in part on the power telemetry and the power shelf telemetry, respective power limits for respective individual nodes of the plurality of nodes, including determining a first power limit for a first node of the plurality of nodes; and providing the determined respective power limits to the respective individual nodes of the server rack, including providing the first power limit to the first node.

In some embodiments, the method further includes: limiting, by the first node, the power consumption of the first node to at or below the first power limit.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 5A-5D depict four interconnected parts of one detailed flow-chart for calculating and providing node power-limits to nodes according to methods for disaggregated power control of a server rack, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may consist of various combinations of a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include components such as Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
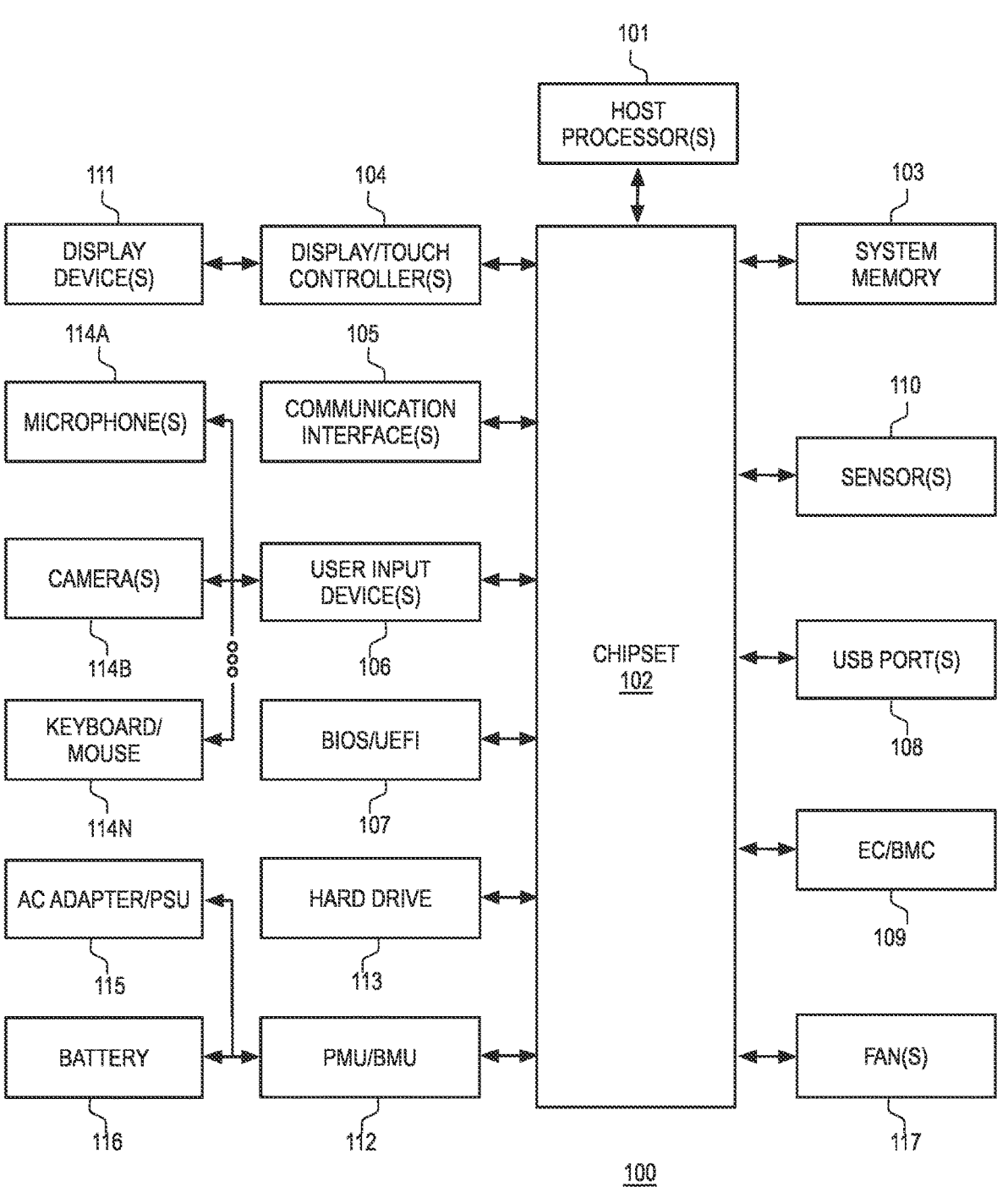
FIG. 1 is a diagram illustrating examples of hardware components of an Information Handling System (IHS), according to some embodiments.

FIG. 1 is a block diagram of hardware components of IHS 100, which may be used to implement systems and methods for disaggregated power control of a server rack.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.). In some embodiments, the host processor(s) 101 can include memory built into the host processor(s) from which, for example, program instructions can be executed.

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116. A non-limiting example of a BMC 109 is the integrated Dell Remote Access Controller (iDRAC) from Dell, Inc.®.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. For example, IHS 100 may include security processors (e.g., Trusted Platform Module (TPM)), GPUs, and/or AI accelerators.

Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Typically, an IHS, such as a server, is going to have AC power coming into its power supplies. With servers, there's usually more than one power supply. With a normal runtime, everything's healthy and a server is within its power bounds. A server is loaded and is consuming the power. With a failure scenario, a power supply might go down and so the power source is reduced, or something on the server is overheating, and the power consumption of the device needs to be reduced. Therefore, sometimes power to devices needs to be controlled because of external power delivery issues. Power of the device needs to be controlled because of internal reasons, independent of the power capability that is being supplied.

Typically, an EC/BMC can perform the power control. For example, EC/BMC 109 may implement operations for interfacing with power adapter/PSU 115 in managing power for IHS 100. In a server rack environment, the EC/BMC in each node manages the PSUs and implements redundancy and power control behaviors to respond to PSU failures and implement PSU hardware protection. As an example, if a server rack contained 50 servers, and each server had two power supplies, then there would be 100 power supplies inside each of the racks, with the EC/BMC of each of the servers monitoring their own two power supplies. If one of the power supplies in a traditional server is lost, then the EC/BMC needs to control power so that the limits of that one power supply are not exceeded.

However, a new paradigm called disaggregated power involves power supplies that are external to the server. With rack-level implementations, disaggregated power removes the power supplies (e.g., PSUs) from the nodes, and instead places multiple PSUs into a device called a power shelf. A power shelf is a group of power supplies, along with possibly other components, in an enclosure of a rack shelf. Disaggregated power can mean that at least the AC to DC part of the power supplies is removed, from inside the server, to the rack, in some embodiments. Multiple power shelves of a rack can deliver power to a rack of nodes via a bus bar (e.g., 51V bus bar). Therefore, with disaggregated power, the EC/BMC cannot talk to those power supplies anymore because the power supplies are per-rack, or at the rack level.

For example, with disaggregated power, there can be 6 power supplies per power shelf. A power shelf can take in the AC input and output DC voltage across the bus bar, which can be around the back of the rack. In some embodiments, the bus bar can be 51 volts. When the compute servers plug into such a rack, they're going to input those 51 volts being generated by all the power supplies, that the compute servers themselves don't care about anymore from a traditional perspective. With disaggregated power, the capability to control power by an individual server is removed. However, there is still value in knowing what power is available, what servers are healthy, and what the power limits are in a rack level environment, instead of at the internal server level.

Unfortunately, with such rack-level disaggregated power, there is not a method to implement graceful power and control behaviors in the rack of nodes. Existing features rely on high-speed low-latency connections to the infrastructure, which is not available in this disaggregated power environment. There does not exist a feature in the rack scale-out space that enables right-sizing of the disaggregated power infrastructure, and implementing graceful keep-alive behaviors when there is insufficient power infrastructure for the given devices, load, and/or environmental conditions For example, a power infrastructure failure for one or more power shelves can have a domino effect on other power shelves in a rack.

Figure 2:
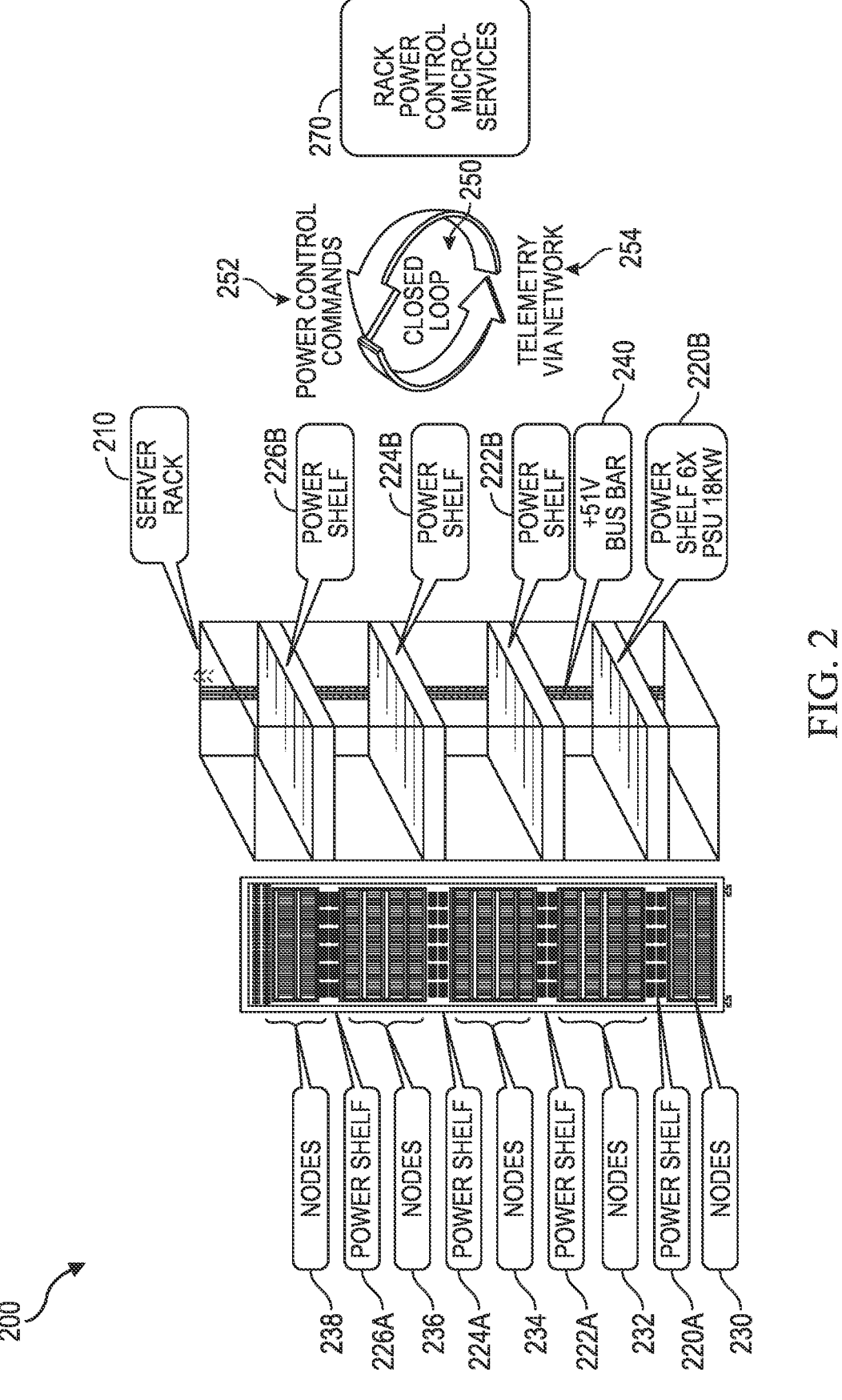
FIG. 2 depicts a server rack with nodes and power shelves for disaggregated power control of a server rack, according to some embodiments.

FIG. 2 depicts a system 200 with a server rack 210 with nodes (230, 232, 234, 236, 238) and power shelves (220*a-b*, 222*a-b*, 224*a-b*, 226*a-b*) for disaggregated power control of a server rack, according to some embodiments. The server rack on the left-side of FIG. 2 illustrates the nodes (230, 232, 234, 236, 238) and power shelves (220*a*, 222*a*, 224*a*, and 226*a*) filled into the server rack. The server rack 210 on the right-side of FIG. 2 illustrates a server rack with just power shelves (220*b*, 222*b*, 224*b*, and 226*b*). The server rack 210 also includes a 51V bus bar 240 and runs vertically up and down the back-side of the rack 210. In some embodiments there is one bus bar, and in other embodiments there are multiple bus bars per rack. FIG. 2 also illustrates a closed loop algorithm 250 of a rack power control micro-services component 270. The closed-loop algorithm 250 receives telemetry via a network 254 and issues power control commands 252 to the server rack 210.

Without the closed-loop algorithm 250 and rack power control micro-services component 270, a problem can occur with disaggregated power where more power is drawn by nodes than supplied by the power shelves. For example, if only one power shelf is powered-on, such as only power shelf 220, and the other power shelves (222, 224, 226) are not powered-on, then every single server of ever node (230, 232, 234, 236, 238) can't be powered on and running at full power, with the rack staying within the limits of that one power shelf.

However, staying with the example above, the individual servers don't know that power limitation information. The servers, from a fundamental perspective, don't know what the power supplies are. An individual server 230 simply observes 51 volts on the bus bar 240. If a server is told to turn on, it observes the 51 volts on the bus bar, determines it can turn on, and then turns on. Similarly, the other servers of the other nodes (232, 234, 236, 238) also can also observe the 51 volts on the bus bar, determine they can turn on, and turn on. If, for example, the rack is a 100 kilowatt rack, but there is only 25 kilowatts of supply because only one of the four power shelves are turned on, then this scenario is a problem, since 25 kW of supply cannot supply 100 kW of demand.

Some embodiments of the systems and methods for disaggregated power control of a server rack solves these and other problems by integrating a feature set into an application, console, container, plugin, or set of micro-services, for a one-to-many management suite. In some embodiments the feature set can implement power and control behaviors across a rack of nodes with disaggregated power via a closed loop algorithm and network-based telemetry and power control commands. An example of a console, container, plugin, or set of micro-services, for a one-to-many management suite, is the rack power control micro-services 270. The rack power control micro-services 270 can acquire the average power capabilities of the power shelves (220, 222, 224, 226) and nodes (230, 232, 234, 236, 238), collect power telemetry, and respond to power related events. Such a design can implement rack scale-out disaggregated power control and behaviors to enable right-sizing of the power infrastructure, and to provide dynamic keep-alive features when there is an insufficient power condition.

Figure 3:
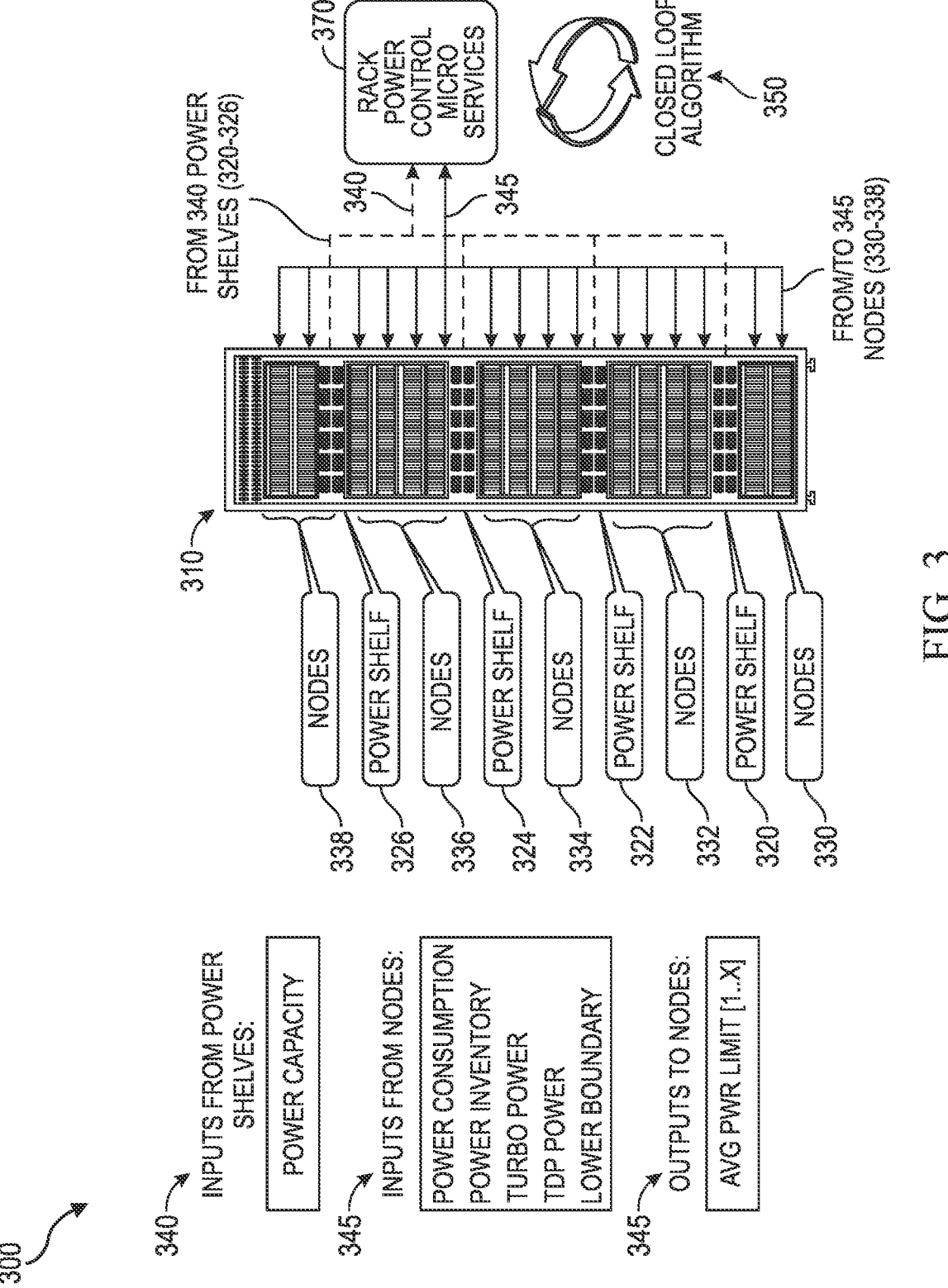
FIG. 3 depicts a server rack with nodes and power shelves for disaggregated power control of a server rack, while further depicting inputs from and outputs to the nodes and power shelves, according to some embodiments

FIG. 3 depicts a system 300 server rack 310 with nodes (330, 332, 334, 336, 338) and power shelves (320, 322, 324, 326) for disaggregated power control of a server rack, while further depicting inputs (340, 345) from and outputs (345) to the nodes and power shelves, according to some embodiments.

In some embodiments, the power shelves (320, 322, 324, 326) can include a power shelf management controller ("PMC"). A PMC operates like the BMC of a node. A PMC allows an outside entity to communicate with the power shelf. A PMC can obtain and transmit telemetry. PMC can turn the power shelf on or off. A PMC can identify what the voltage of the power shelf is, how much power is coming out of it, if there's an individual power supply that has failed or is unhealthy, the power shelf capacity, and/or how many healthy power supplies are operational in the power shelf.

Therefore, in some embodiments the rack power control micro-services 370, or a similar application, console, container, plugin, or set of micro-services, can query information from the power shelf via the PMC. It can obtain the power shelf telemetry (e.g., power capacity, power capability) from the PMC of the power shelves (320, 322, 324, 326) as inputs 340, for example. Effective Power Shelf capacity can be determined by the sum of the capacities from each healthy PSU in a power shelf. The capability of each power shelf can be identified to provide power to the rack.

In addition, the rack power control micro-services 370, or a similar application, console, container, plugin, or set of micro-services, can query information from the ECs/BMCs of the nodes (330, 332, 334, 336, 338). It can obtain power telemetry (e.g., power inventory, current power consumption, potential power consumption, Turbo Power ("Pdyn"), Thermal Design Power ("TDP"), node power inventory lower boundary ("NLB"), requirements, and/or operating conditions) as inputs 345 from the nodes, for example. The NLB can be, for example, the power that a node requires when it is fully throttled.

Then the rack power control micro-services 370, or a similar application, console, container, plugin, or set of micro-services, can make decisions based on such information using a closed loop algorithm 350. The closed loop algorithm 350 can calculate power limits every cycle to maximize performance across the nodes in a cycle. In some embodiments, a cycle is around one second in length. In some embodiments, the closed loop algorithm 350 determines the average power limit for each node [1 . . . x] and provides this information to the nodes (330, 332, 334, 336, 338) as outputs 345. In some embodiments, the algorithm does not tell a node to power off, but instead does tell a node how much power it can consume.

Therefore, some embodiments of the systems and methods for disaggregated power control of a server rack provide for an application, console, container, plugin, or set of micro-services that has a construct of a rack, the populated nodes of the rack, and disaggregated power shelves of the rack. Some embodiments employ a telemetry cycle via network access to the node ECs/BMCs and power shelf PMCs. In some embodiments, the telemetry cycle includes power inventory and consumption from each node and the power delivery capability from each power shelf.

Some embodiments provide a dynamic power control algorithm, instead of a power allocation or step-up algorithm. In some embodiments, when there is sufficient power, performance can be maximized by applying large power limits. In some embodiments, when there is insufficient power, higher power limits can be prioritized for utilized nodes. Some embodiments can dynamically calculate power limits every telemetry cycle to maximize performance across all nodes. In some embodiments, the management entity is network based or otherwise executed outside of the BMC of a node. In some embodiments, the management entity manages disaggregated power shelves as opposed PSUs or hot swap controllers that are typically co-located with the entity that implements the algorithm.

In some embodiments, nodes can power-on and power-off independent of the closed loop algorithm. In some embodiments, the algorithm does not tell a node to power off, but it does tell a node how much power it can consume until the next telemetry cycle, when the value will be updated.

In some embodiments, a cycle can be around one second in length, or even slower. For example, the control cycle can be between one order of magnitude on either side of one second—in other words between 0.1 seconds and 10 seconds. These types of embodiments provide many important features, even though the control loop is not significantly faster than one second. An example is enforcing PSU redundancy in a rack. If the rack redundancy is designed to lose 2 PSUs, then due to typical PSU failure rates they would be expected to be significantly separated in time. A control algorithm of around one second, as contemplated by some embodiments, can still implement reactive power controls to manage the rack power across nodes, such that the system is not at risk of a catastrophic failure if one more PSU is lost. This speed of control loop also works if power controls need to be put in place if a multi-rack cooling unit fails. It is not expected that thermals will immediately spike, and a control loop of around 1 second or slower can provide valuable protection in this case.

Figure 4:
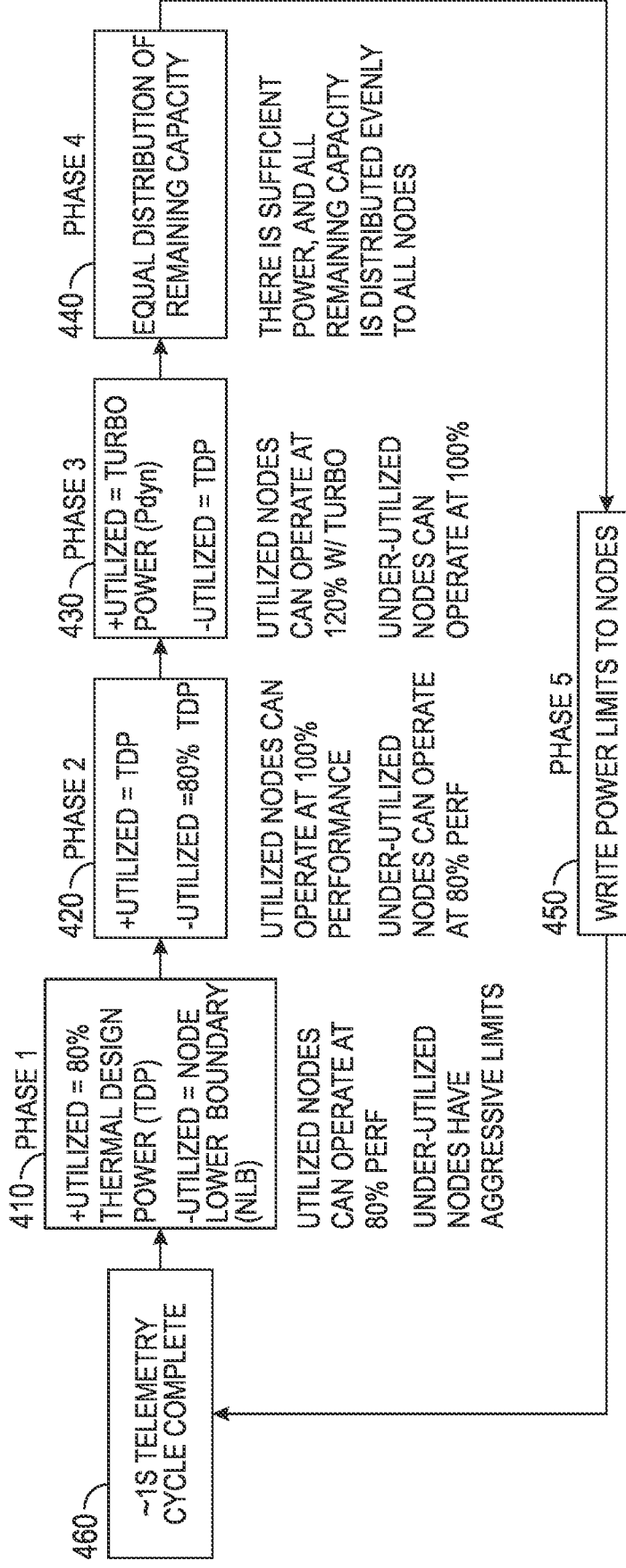
FIG. 4 is a high-level flowchart illustrating an example workflow for disaggregated power control of a server rack, according to some embodiments.

FIG. 4 is a high-level flowchart 400 illustrating an example workflow for disaggregated power control of a server rack, according to some embodiments. In some embodiments, the workflow 400 may be performed, at least in part, by operation of systems through the execution of program instructions stored in system memory 103 and executed by host processor(s) 101 of IHS 100. FIG. 4 depicts the high-level algorithm 400 for determining the average power limit for each node [1 . . . x] and providing this information to the nodes (330, 332, 334, 336, 338) as outputs 345 (referring back to FIG. 3).

In FIG. 4, power capacity is distributed in a phased method, and then power limits are written to each node. With the workflow of FIG. 4, node performance is not limited when there is sufficient power, but if there is not sufficient power, then utilized nodes will have larger power limits than under-utilized nodes. Determining whether a node is utilized or under-utilized is explained below.

The method depicted by FIG. 4 first determines whether a node is utilized ("+utilized") or under-utilized ("−utilized"). The algorithm can determine this for some or all the nodes. In order to determine utilization, the power consumption can be compared to the attributes of a configuration. In some embodiments, an attribute or a collection of attributes of a configuration, and/or the instantaneous power consumption, can be compared to the capability of that particular config. In some embodiments, power consumption of each server can be compared to a power inventory attribute. As an example, one such attribute can be node power inventory lower boundary (NLB). If a node's power consumption is above the node lower boundary, then it's utilized, and if it's below the node lower boundary, it's underutilized, in some embodiments. More generally, it can be determined if a configuration is utilized ("+utilized") or underutilized ("−utilized").

For example, the NLB value might be 50% of the maximum power of a node. In some embodiments, the maximum power can be the Thermal Design Power ("TDP"). As a further example, one server might have a maximum power (e.g., TDP) of 1000 Watts. Then, if the power consumption of the node is between 501 and 1000 Watts in these examples, the node would be utilized. If the power consumption of the node is at 500 Watts and below, in these examples, then the node would be underutilized. The cutoff line between utilized and under-utilized can be defined by configuration attributes, in some embodiments. In some embodiments, the cutoff line can be anywhere between a really low idle power, up to around $\frac{3}{4}^{ths}$ of a maximum power draw. In some embodiments, such a cutoff line can vary.

The flowchart of FIG. 4 begins at phase 1 (410). At phase 1, if a node is utilized, then the workflow allocates its power as 80% of the thermal design power of the node. If a node is underutilized, on the other hand, the workflow allocates only the NLB power inventory to the node. Therefore, in phase 1, utilized nodes can operate at 80% of maximum power, while under-utilized nodes have aggressive limits.

Once the power allocation for phase 1 (410) is completed, the workflow then adds up all the distributed power and compares it to the power supply to determine whether there is any power left. If there is power left to be allocated, then the workflow continues to phase two (420).

At phase 2 (420), if a node is utilized, then the workflow allocates its power as 100% of the thermal design power of the node. If a node is underutilized, on the other hand, the workflow allocates its power as 80% of the thermal design power of the node. Therefore, in phase 1, utilized nodes can operate at 100% of maximum performance, while under-utilized nodes can operate at 80% of maximum performance.

Once the power allocation for phase 2 (420) is completed, the workflow then adds up all the distributed power and compares it to the power supply to determine whether there is any power left. If there is power left to be allocated, then the workflow continues to phase three (430).

At phase 3 (430), if a node is utilized, then the workflow allocates its power as Turbo Power ("Pdyn"), which in some embodiments is 120% of the thermal design power of the node. If a node is underutilized, on the other hand, the workflow allocates its power as 100% of the thermal design power of the node. Therefore, in phase 1, utilized nodes can operate at 120% with turbo power, while under-utilized nodes can operate at 100% of maximum performance.

Once the power allocation for phase 3 (430) is completed, the workflow then adds up all the distributed power and compares it to the power supply to determine whether there is any power left. If there is power left to be allocated, then the workflow continues to phase four (440). Phase 4 provides for equal distribution of the remaining power capacity. In phase 4, there is sufficient power, and all remaining power capacity is distributed evenly to all nodes.

Once the power allocation for phase 4 (440) is completed, the workflow then transitions to phase 5 (450) which writes the determined power limits to the nodes. Phase 5 (450) then transitions to block 460 where the approximately 1 second telemetry cycle is complete. Block 460 then transitions back to block 410, to repeat the cycle again.

As shown by the example method detailed in FIG. 4, some embodiments of the systems and methods for disaggregated power control of a server rack provide a rack-level solution to manage average power across numerous nodes that source power from multiple disaggregated power shelf devices. Some embodiments provide the ability to mitigate over-provisioning power to a rack. In addition, some embodiments provide a phased average power limit approach that categorizes nodes as utilized or under-utilized by comparing power consumption to a power inventory attribute (such as NLB), and then prioritizes the average power limits for the utilized nodes. In addition, some embodiments provide a network-based closed loop power management, telemetry, and control algorithm to manage average power, within the capacity of power shelves and PSUs, during normal run-time and failure conditions. This network-based closed loop power management, telemetry, and control algorithm can maximize performance, and reduce the risk of latching off healthy power shelves during failures or excursions.

In addition, some embodiments provide an ability to implement graceful power control on new rack-scale-out solutions that implement power-shelf devices with a high-latency connection to devices. Some embodiments provide a robust power control behavior feature set in the new rack scale-out environment where PSUs no longer reside on, or are directly managed by, each node or modular chassis. Some embodiments allow for rack owners/administrators/users to perform routine maintenance on their power delivery infrastructure. In some cases, it is common to take a power shelf offline in a rack, and some embodiments of the present disclosure provide a critical keep alive feature in these scenarios. Finally, some embodiments can continue to provide similar power control behaviors generation over generation, even as the fundamental hardware and architecture changes from locally-managed infrastructure to network-managed infrastructure.

FIGS. 5A-5D depict four interconnected parts of one detailed flow-chart 500 for calculating and providing node power-limits to nodes according to methods for disaggregated power control of a server rack, according to some embodiments. In some embodiments, the workflow 500 may be performed, at least in part, by operation of systems through the execution of program instructions stored in system memory 103 and executed by host processor(s) 101 of IHS 100. FIG. 5 depicts a detailed algorithm 500 for determining the average power limit for each node [1 . . . x] and providing this information to the nodes (e.g., 330, 332, 334, 336, 338) as outputs 345 (referring back to FIG. 3).

First, at FIG. 5A, the flowchart 500 obtains a number of inputs 501 from the node and power shelf, and also maintains a number of internal variables. From node inventory and telemetry, the flowchart obtains a Node Power Consumption for each given node, a Node Turbo Power (NODE_Pdyn) for each given node, a Node Thermal Design Power (NODE_TDP) for each given node, and a Node Lower Boundary (NODE_NLB) for each given node. From the power shelves, the flowchart obtains a total Power Shelf Effective Capacity for all of the power shelves.

The flowchart 500 also uses a number of internal variables. These variables include a node device number (NODE #) which is initialized to zero. The nodes are assumed to have device numbers that range from 1 to the total number of nodes (TOTAL_NODES). Therefore, TOTAL_NODES is also a variable that is initialized to the total number of nodes in the system for which the method of this flowchart is associated. In addition, the average power for a given node (NODE_AVG_PWR) is also a set of internal variables, where there is one variable per node. This variable keeps a running tabulation of the power allocated to a given node. There are a TOTAL_NODES number of these NODE_AVG_PWR internal variables. Finally, the last internal variable is a remaining power capacity variable (POWER_CAPACITY) that is initially set to the Power Shelf Effective Capacity for all of the power shelves.

The flowchart begins at block 502 which determines whether it is time for a 1-second telemetry cycle. If it is not, then 502 simply reverts back upon itself until it is time, in which case the flowchart transitions to node 504. Block 504 starts the average power computation. Block 504 transitions to block 506 which adds 1 to the NODE # internal variable. The 506 to 522 loop is thereby computed for each node of the system, until (at 522) the NODE # is equal to the TOTAL_NODES, in which case the flowchart moves on to FIG. 5B.

Staying with the 506 to 522 loop, though, after 506 increases the NODE # internal variable by 1, the flowchart transitions to block 510 which determines whether the power consumption for that node (Node Power Consumption) is greater than the node lower boundary (NLB). This decision block, in effect, determines whether the node is a utilized node, or an under-utilized node. If the node is a utilized node, then the power consumption for that node is greater than the NLB, and so the flowchart transitions to block 512. If the node is an under-utilized node, then the power consumption for that node is less than the NLB, and so the flowchart transitions to block 508.

Since in this phase 1, utilized nodes get 80% of the TDP, at block 512, the NODE_AVG_PWR internal variable for this specific node gets 80% of the NODE_TDP added to it. The flowchart then transitions to block 516 where the running tabulation of the remaining power capacity (POWER_CAPACITY) is subtracted by 80% of the NODE_TDP. The flowchart then transitions to block 518.

With regard to under-utilized nodes, since in this phase 1, under-utilized nodes get assigned the NLB, at block 508, the NODE_AVG_PWR internal variable for this specific node gets the NODE_NLB added to it. The flowchart then transitions to block 514 where the running tabulation of the remaining power capacity (POWER_CAPACITY) is subtracted by the NODE_NLB. The flowchart then transitions to block 518, like the other 512-516 branch.

After power is assigned to each individual node, from Node(1) all the way up to Node(Total_Nodes), the running tabulation of the remaining power capacity (POWER_CAPACITY) is checked to ensure that there is still remaining power capacity left. Therefore, block 518 determines whether the power capacity is greater than 0. If it is not greater than 0, then there is no power capacity remaining, and the algorithm ends at block 520. If the running tabulation of the remaining power capacity is greater than 0, then power capacity still remains, and the flowchart transitions to block 522.

Block 522 completes the loop with block 506. At block 522, if the internal variable NODE # is equal to the TOTAL_NODES, then all nodes have been through the calculation of phase 1, and therefore the flowchart moves on to phase 2 in FIG. 5B. If, however, the internal variable NODE # is not equal to the TOTAL_NODES, then the flowchart returns to 506 for the same calculation to be computed for the next node of the total number of nodes.

Figure 5B:
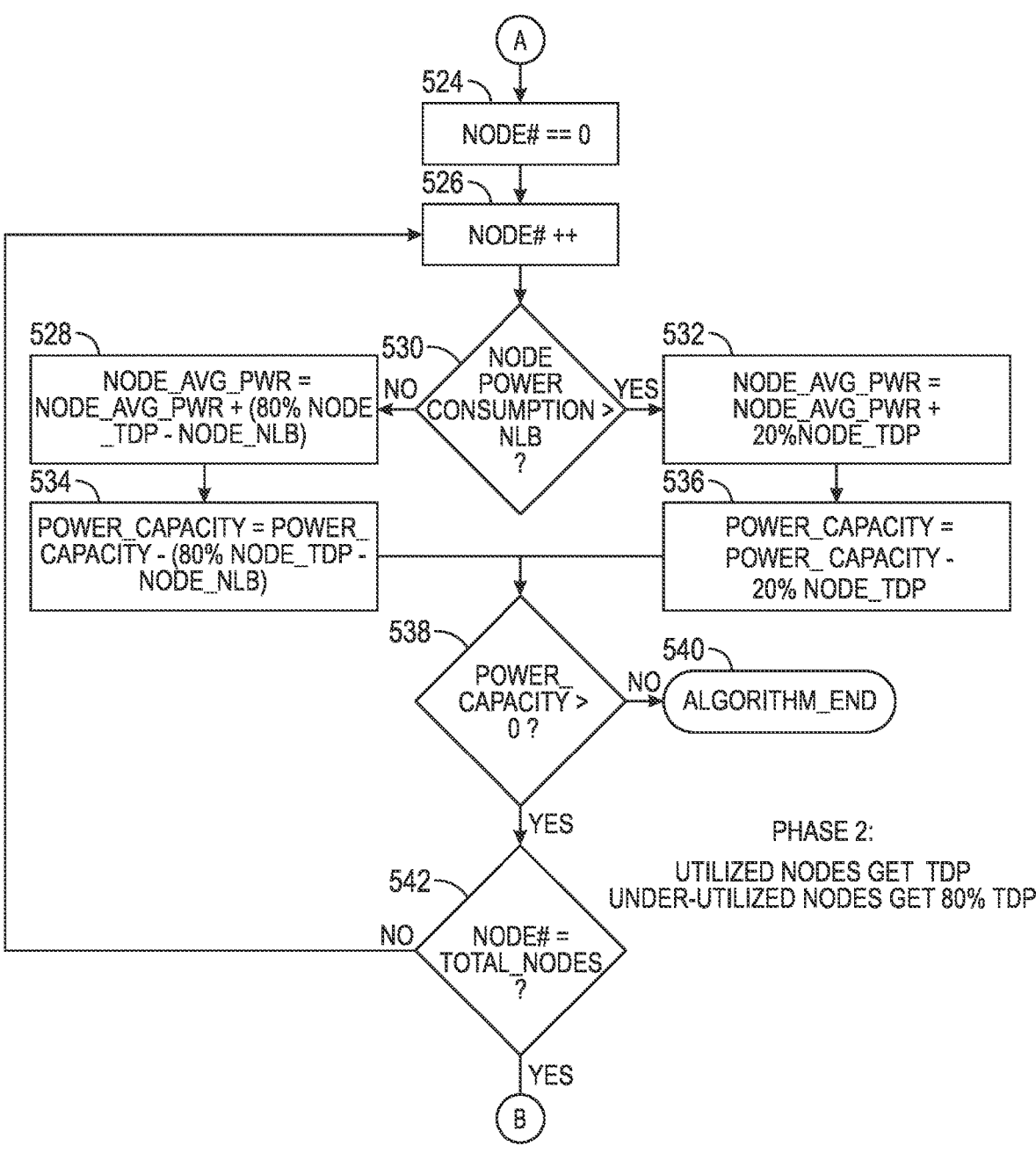

Referring now to FIG. 5B, the flowchart first resets the internal variable NODE # to be equal to 0 (524). Then the flowchart transitions to block 526 which begins another loop corresponding to phase 2 of the algorithm. Phase 2 of the algorithm corresponds to the loop that begins at block 526 and ends at block 542. The 526 to 542 loop is thereby computed for each node of the system, until (at 542) the NODE # is equal to the TOTAL_NODES, in which case the flowchart then moves on to FIG. 5C.

Staying with the 526 to 542 loop, though, after 526 increases the NODE # internal variable by 1, the flowchart transitions to block 530 which determines whether the power consumption for that node (Node Power Consumption) is greater than the node lower boundary (NLB). This decision block, in effect, determines whether the node is a utilized node, or an under-utilized node. If the node is a utilized node, then the power consumption for that node is greater than the NLB, and so the flowchart transitions to block 532. If the node is an under-utilized node, then the power consumption for that node is less than the NLB, and so the flowchart transitions to block 528.

Since in this phase 2, utilized nodes are assigned 100% of TDP, at block 532, the NODE_AVG_PWR internal variable for this specific node gets 20% of the NODE_TDP added to it. In previous phase 1, the NODE_AVG_PWR internal variable for this specific node already had 80% of the NODE_TDP added to it. Now, with an additional 20% of the NODE_TDP added to the NODE_AVG_PWR variable for this specific node, the internal variable should equal to 100% of the NODE_TDP. The flowchart then transitions to block 536 where the running tabulation of the remaining power capacity (POWER_CAPACITY) is subtracted by 20% of the NODE_TDP. The same reasoning applies to this calculation as to the previous NODE_AVG_PWR calculation. The flowchart then transitions to block 538.

With regard to under-utilized nodes, since in this phase 2, under-utilized nodes are assigned 80% of TDP. Therefore, at block 528, the NODE_AVG_PWR internal variable for this specific node gets 80% of the NODE_TDP added to it, and then NODE_NLB subtracted from it. In previous phase 1, the NODE_AVG_PWR internal variable for this specific node already had NODE_NLB added to it. Now, with 80% of the NODE_TDP added to the NODE_AVG_PWR internal variable for this specific node, and the NODE_NLB subtracted from it, the internal variable should equal to 80% of the NODE_TDP. The flowchart then transitions to block 534 where the running tabulation of the remaining power capacity (POWER_CAPACITY) is subtracted by the 80% of the NODE_TDP minus the NODE_NLB. The same reasoning applies to this POWER_CAPACITY calculation as to the previous NODE_AVG_PWR calculation. The flowchart then transitions to block 538, like the other 532-536 branch.

After power is assigned to each individual node, from Node(1) all the way up to Node(Total_Nodes), the running tabulation of the remaining power capacity (POWER_CAPACITY) is checked to ensure that there is still remaining power capacity left. Therefore, block 538 determines whether the power capacity is greater than 0. If it is not greater than 0, then there is no power capacity remaining, and the algorithm ends at block 540. If the running tabulation of the remaining power capacity is greater than 0, then power capacity still remains, and the flowchart transitions to block 542.

Block 542 completes the loop with block 526. At block 542, if the internal variable NODE # is equal to the TOTAL_NODES, then all nodes have been through the calculation of phase 2, and therefore the flowchart moves on to phase 3 in FIG. 5C. If, however, the internal variable NODE # is not equal to the TOTAL_NODES, then the flowchart returns to 526 for the same calculation to be computed for the next node of the total number of nodes.

Figure 5C:
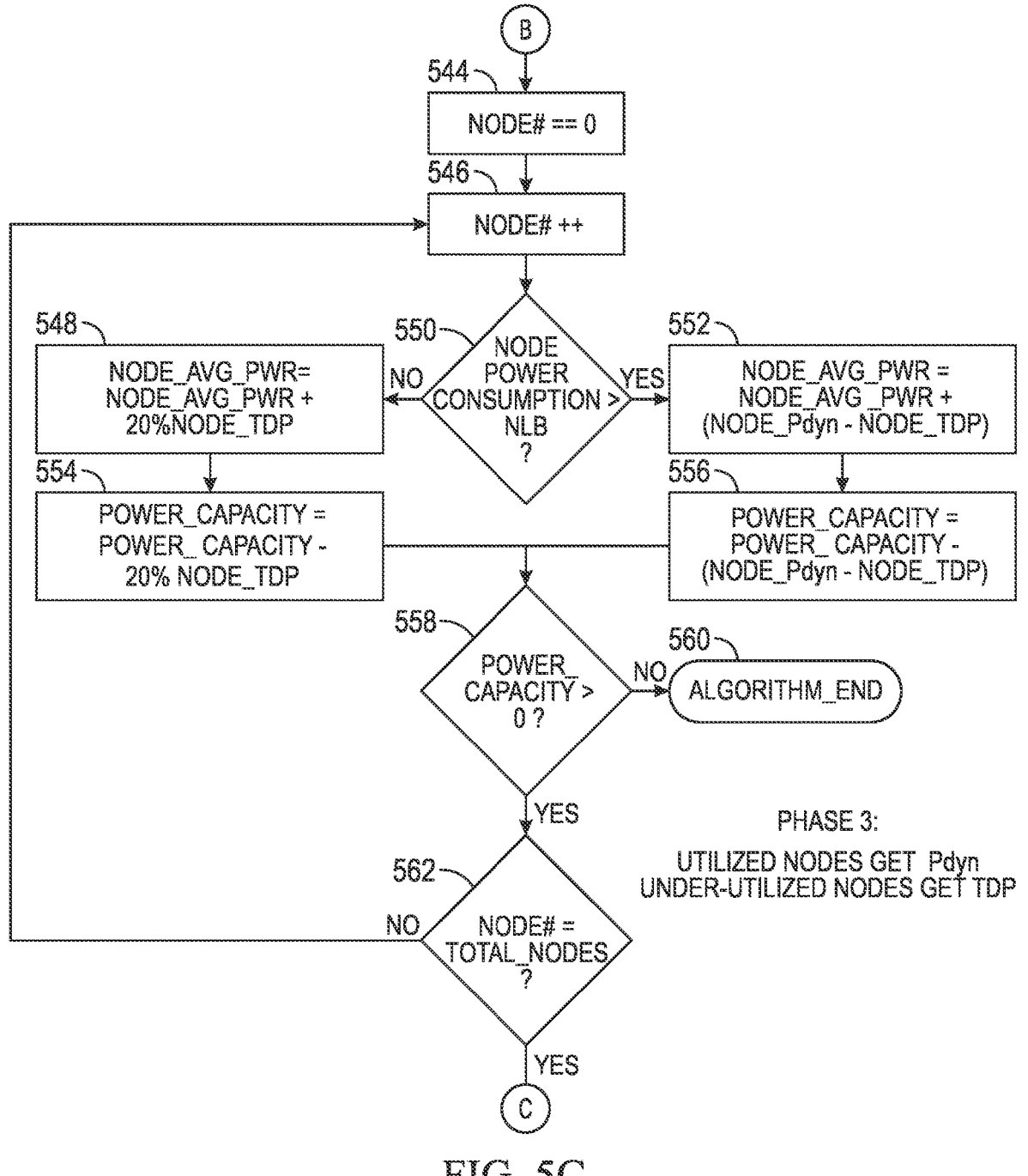

Referring now to FIG. 5C, the flowchart first resets the internal variable NODE # to be equal to 0 (544). Then the flowchart transitions to block 546 which begins another loop corresponding to phase 3 of the algorithm. Phase 3 of the algorithm corresponds to the loop that begins at block 546 and ends at block 562. The 546 to 562 loop is thereby computed for each node of the system, until (at 562) the NODE # is equal to the TOTAL_NODES, in which case the flowchart then moves on to FIG. 5C.

Staying with the 546 to 562 loop, though, after 546 increases the NODE # internal variable by 1, the flowchart transitions to block 550 which determines whether the power consumption for that node (Node Power Consumption) is greater than the node lower boundary (NLB). This decision block, in effect, determines whether the node is a utilized node, or an under-utilized node. If the node is a utilized node, then the power consumption for that node is greater than the NLB, and so the flowchart transitions to block 552. If the node is an under-utilized node, then the power consumption for that node is less than the NLB, and so the flowchart transitions to block 548.

Since in this phase 3, utilized nodes are assigned turbo power (NODE_Pdyn). Therefore, at block 552, the NODE_AVG_PWR internal variable for this specific node gets NODE_Pdyn added to it, and then NODE_TDP subtracted from it. In previous phase 2, the NODE_AVG_PWR internal variable for this specific node already had 100% of NODE_TDP added to it. Now, with NODE_Pdyn added to the NODE_AVG_PWR internal variable for this specific node, and the NODE_TDP subtracted from it, the internal variable should equal to NODE_Pdyn. The flowchart then transitions to block 556 where the running tabulation of the remaining power capacity (POWER_CAPACITY) is subtracted by the NODE_Pdyn minus the NODE_TDP. The same reasoning applies to this calculation as to the previous NODE_AVG_PWR calculation. The flowchart then transitions to block 558.

With regard to under-utilized nodes, since in this phase 3, under-utilized nodes are assigned 100% of TDP. Therefore, at block 548, the NODE_AVG_PWR internal variable for this specific node gets 20% of the NODE_TDP added to it. In previous phase 2, the NODE_AVG_PWR internal variable for this specific node already had 80% of the NODE_TDP. Now, with an additional 20% of the NODE_TDP added to the NODE_AVG_PWR internal variable for this specific node, the internal variable should equal to 100% of the NODE_TDP. The flowchart then transitions to block 554 where the running tabulation of the remaining power capacity (POWER_CAPACITY) is subtracted by 20% of the NODE_TDP. The same reasoning applies to this POWER_CAPACITY calculation as to the previous NODE_AVG_PWR calculation. The flowchart then transitions to block 558, like the other 552-556 branch.

After power is assigned to each individual node, starting with from Node(1) and ending with Node(Total_Nodes), the running tabulation of the remaining power capacity (POWER_CAPACITY) is checked to ensure that there is still remaining power capacity left. Therefore, block 558 determines whether the power capacity is greater than 0. If it is not greater than 0, then there is no power capacity remaining, and the algorithm ends at block 560. If the running tabulation of the remaining power capacity is greater than 0, then power capacity still remains, and the flowchart transitions to block 562.

Block 562 completes the loop with block 546. At block 562, if the internal variable NODE # is equal to the TOTAL_NODES, then all nodes have been through the calculation of phase 3, and therefore the flowchart moves on to phase 4 in FIG. 5D. If, however, the internal variable NODE # is not equal to the TOTAL_NODES, then the flowchart returns to 546 for the same calculation to be computed for the next node of the total number of nodes.

Figure 5D:
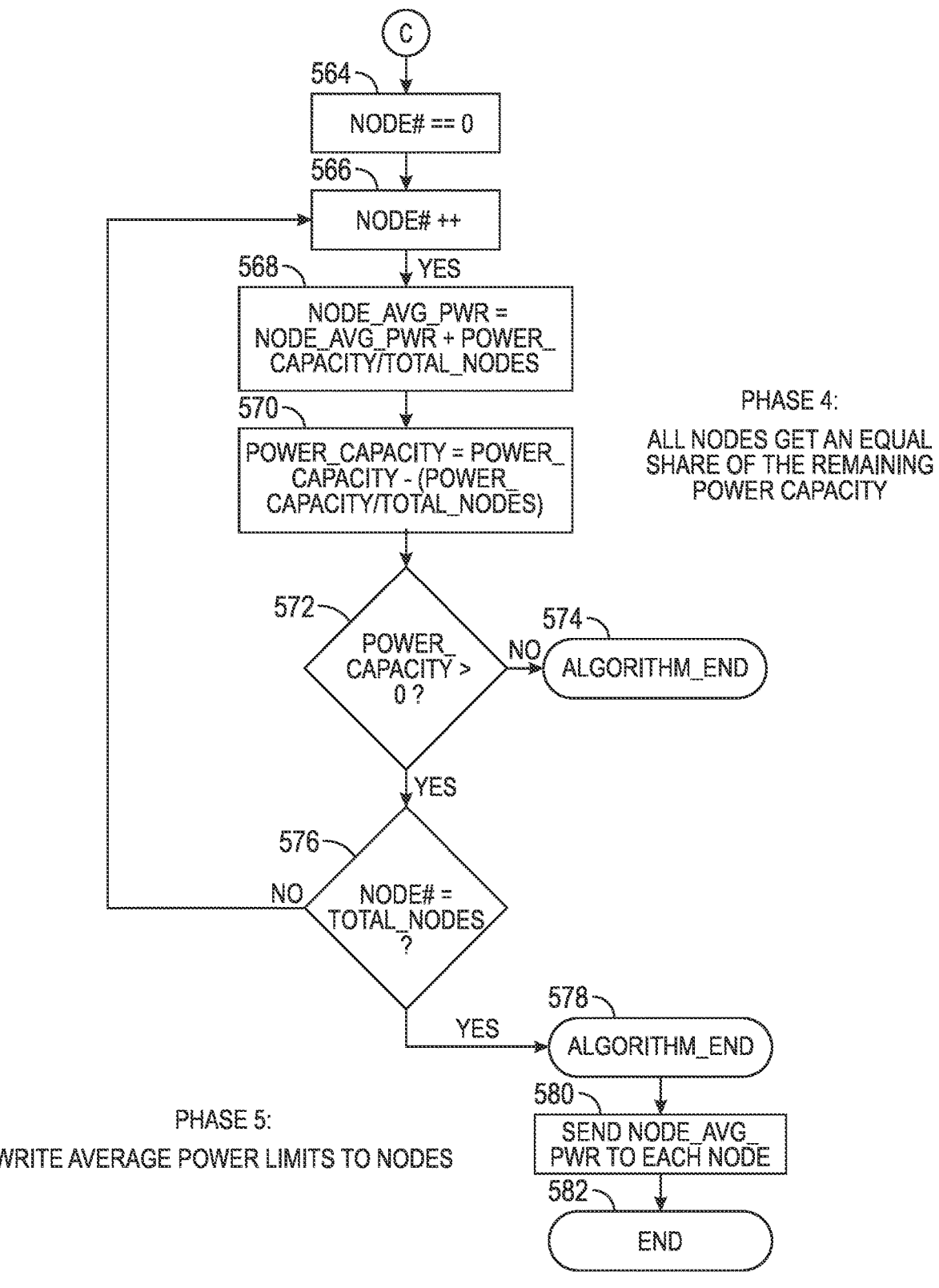

Referring now to FIG. 5D, the flowchart first resets the internal variable NODE # to be equal to 0 (564). Then the flowchart transitions to block 566 which begins another loop corresponding to phase 4 of the algorithm. Phase 4 of the algorithm corresponds to the loop that begins at block 566 and ends at block 576. The 566 to 576 loop is thereby computed for each node of the system, until (at 576) the NODE # is equal to the TOTAL_NODES, in which case the flowchart then moves on to block 578 and phase 5.

Staying with the 566 to 576 loop, though, after 566 increases the NODE # internal variable by 1, the flowchart transitions to block 568. In phase 4, utilized nodes and under-utilized nodes are not treated differently. Therefore, there is no decision block that determines whether the node is a utilized node, or an under-utilized node. The flowchart transitions right to block 568.

In phase 4, all nodes get an equal share of the remaining power capacity. Therefore, at block 568, the NODE_AVG_PWR internal variable for this specific node gets POWER_CAPACITY divided by TOTAL_NODES added to itself. This in effect adds to the node's assigned power an equal portion of the remaining total power capacity of the system. Each node of TOTAL_NODES should receive a nearly equal portion of the remaining POWER_CAPACITY of the system. The flowchart then transitions to block 570 where the running tabulation of the remaining power capacity (POWER_CAPACITY) is subtracted by the POWER_CAPACITY divided by TOTAL_NODES. The same reasoning applies to this calculation as to the previous NODE_AVG_PWR calculation. The flowchart then transitions to block 572.

After power is assigned to each individual node, starting with from Node(1) and ending with Node(Total_Nodes), the running tabulation of the remaining power capacity (POWER_CAPACITY) is checked to ensure that there is still remaining power capacity left. Therefore, block 572 determines whether the power capacity is greater than 0. If it is not greater than 0, then there is no power capacity remaining, and the algorithm ends at block 574. If the running tabulation of the remaining power capacity is greater than 0, then power capacity still remains, and the flowchart transitions to block 576.

Block 576 completes the loop with block 566. At block 576, if the internal variable NODE # is equal to the TOTAL_NODES, then all nodes have been through the calculation of phase 4, and therefore the flowchart moves on to phase 5 in FIG. 5D at block 578. If, however, the internal variable NODE # is not equal to the TOTAL_NODES, then the flowchart returns to 566 for the same calculation to be computed for the next node of the total number of nodes.

At block 578 the algorithm ends. The flowchart then transitions to block 580 which sends the appropriate NODE_AVG_PWR internal variable to each node. There are a total of TOTAL_NODES NODE_AVG_PWR internal variables, one for each node. The algorithm sends the appropriate one NODE_AVG_PWR internal variable to each node, such that each node receives its own assigned and calculated one NODE_AVG_PWR internal variable. The flowchart then transitions to block 582 where it ends.

In the current embodiment of FIG. 5, if the POWER_CAPACITY internal variable is greater than 0, then the next node will be assigned its full entire amount of the calculated power it is due to receive for that phase. This can cause the POWER_CAPACITY internal variable to be negative after any given step where power limits are increased for a node (e.g., where the NODE_AVG_PWR internal variable for that node is assigned a new power value). An extra step can therefore be added to FIG. 5 to only allocate the amount of power capacity that is available, if the amount to allocate is larger than the remaining capacity. After reading and understanding this disclosure that details these embodiments, one of ordinary skill in the art should be able to modify the method of FIGS. 5A-5D to make such a change.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, wherein the memory comprises program instructions stored thereon that, upon execution by the processor, cause the IHS to:
obtain power telemetry, via a network, from a plurality of nodes of a server rack;
obtain power shelf telemetry, via the network, from one or more power shelves of the server rack, wherein the one or more power shelves comprise one or more disaggregated power shelves that provide dynamic keep-alive features via the network-based telemetries to prevent power infrastructure failure for the one or more power shelves, and wherein each of the one or more disaggregated power shelves comprises one or more power supplies;
determine, based at least in part on the power telemetry and the power shelf telemetry, respective power limits for respective individual nodes of the plurality of nodes, including a first power limit for a first node of the plurality of nodes;
determine that each of the individual nodes is either a utilized node or an under-utilized node; and
provide the determined respective power limits to the respective individual nodes of the server rack, including the first power limit to the first node;
wherein to determine the respective power limits for the respective individual nodes, the program instructions further cause the IHS to:
determine that the respective power limits for the utilized nodes comprise a percentage of a thermal design power above 50%; and
determine that the respective power limits for the under-utilized nodes comprise a node lower boundary power which comprises a percentage of a thermal design power at or below 50%.

2. The IHS of claim 1, wherein the power telemetry comprises at least one of: power inventory of the plurality of nodes, turbo power of the plurality of nodes, thermal design power of the plurality of nodes, or a power inventory lower boundary of the plurality of nodes.

3. The IHS of claim 2, wherein the power shelf telemetry comprises at least one of: power capacity of the one or more power shelves, or power capability of the one or more power shelves.

4. The IHS of claim 1, further comprising:
limit, by the first node, the power consumption of the first node to at or below the first power limit.

5. The IHS of claim 1, wherein the power telemetry comprises power inventory of the plurality of nodes.

6. The IHS of claim 1, wherein the power telemetry comprises thermal design power of the plurality of nodes, or a power inventory lower boundary of the plurality of nodes.

7. The IHS of claim 2, wherein the power inventory lower boundary of the plurality of nodes comprises a power that each of the plurality of nodes requires when it is fully throttled.

8. An Information Handling System (IHS), comprising:

a processor; and a memory coupled to the processor, wherein the memory comprises program instructions stored thereon that, upon execution by the processor, cause the IHS to:

obtain power telemetry, via a network, from a plurality of nodes of a server rack;

obtain power shelf telemetry, via the network, from one or more power shelves of the server rack, wherein the one or more power shelves comprise one or more disaggregated power shelves that provide dynamic keep-alive features via the network-based telemetries to prevent power infrastructure failure for the one or more power shelves, and wherein each of the one or more disaggregated power shelves comprises one or more power supplies;

determine, based at least in part on the power telemetry and the power shelf telemetry, respective power limits for respective individual nodes of the plurality of nodes, including a first power limit for a first node of the plurality of nodes;

determine that each of the individual nodes is either a utilized node or an under-utilized node; and provide the determined respective power limits to the respective individual nodes of the server rack, including the first power limit to the first node;

wherein to determine the respective power limits for the respective individual nodes, the program instructions further cause the IHS to:

determine that the respective power limits for the utilized nodes comprise a thermal design power; and determine that the respective power limits for the under-utilized nodes comprise a percentage of the thermal design power above 50%.

9. An Information Handling System (IHS), comprising:

a processor; and a memory coupled to the processor, wherein the memory comprises program instructions stored thereon that, upon execution by the processor, cause the IHS to:

obtain power telemetry, via a network, from a plurality of nodes of a server rack;

obtain power shelf telemetry, via the network, from one or more power shelves of the server rack, wherein the one or more power shelves comprise one or more disaggregated power shelves that provide dynamic keep-alive features via the network-based telemetries to prevent power infrastructure failure for the one or more power shelves, and wherein each of the one or more disaggregated power shelves comprises one or more power supplies;

determine, based at least in part on the power telemetry and the power shelf telemetry, respective power limits for respective individual nodes of the plurality of nodes, including a first power limit for a first node of the plurality of nodes;

determine that each of the individual nodes is either a utilized node or an under-utilized node; and provide the determined respective power limits to the respective individual nodes of the server rack, including the first power limit to the first node;

wherein to determine the respective power limits for the respective individual nodes, the program instructions further cause the IHS to:

determine that the respective power limits for the utilized nodes comprise a percentage of a thermal design power above 100%; and determine that the respective power limits for the under-utilized nodes comprise the thermal design power.

\* \* \* \* \*